US012292422B2

(12) United States Patent
Fujito et al.

(10) Patent No.: US 12,292,422 B2
(45) Date of Patent: May 6, 2025

(54) LIQUID CHROMATOGRAPH AND FLOW PATH CLEANING METHOD IN LIQUID CHROMATOGRAPH

(71) Applicant: SHIMADZU CORPORATION, Kyoto (JP)

(72) Inventors: Yuka Fujito, Kyoto (JP); Logan Miller, Columbia, MD (US)

(73) Assignee: SHIMADZU CORPORATION, Kyoto (JP)

( * ) Notice: Subject to any disclaimer, the term of this patent is extended or adjusted under 35 U.S.C. 154(b) by 319 days.

(21) Appl. No.: 17/942,982

(22) Filed: Sep. 12, 2022

(65) Prior Publication Data

US 2023/0088216 A1 Mar. 23, 2023

Related U.S. Application Data

(60) Provisional application No. 63/245,805, filed on Sep. 18, 2021.

(51) Int. Cl.
*G01N 30/38* (2006.01)
*B01D 15/14* (2006.01)
(Continued)

(52) U.S. Cl.
CPC ............. *G01N 30/38* (2013.01); *B01D 15/14* (2013.01); *B01D 15/18* (2013.01); *B08B 9/0325* (2013.01);
(Continued)

(58) Field of Classification Search
CPC ........................... G01N 30/20; G01N 2023/20
(Continued)

(56) References Cited

U.S. PATENT DOCUMENTS 7,550,080 B2 * 6/2009 Morikawa .............. G01N 30/88
210/198.2
8,234,939 B2 * 8/2012 Maeda ............... G01N 35/1097
73/864.21
(Continued)

FOREIGN PATENT DOCUMENTS

JP 2016-173256 A 9/2016

*Primary Examiner* — Tran M. Tran
(74) *Attorney, Agent, or Firm* — Renner, Otto, Boisselle & Sklar, LLP (57) ABSTRACT

A liquid chromatograph includes at least one mobile phase supply flow path (6; 42), at least one cleaning solution supply flow path (8; 44) joining the mobile phase supply flow path (6; 42), an analysis flow path (4) provided with a separation column (14), a sampling flow path (2) provided, at a tip end thereof, with a sampling needle (12), a switcher (10; 26) including a high-pressure valve (10) having an injection port (16) and configured to switch a flow path configuration of the liquid chromatograph between a loading state in which the analysis mobile phase supply flow path (6) and the analysis flow path (4) are connected in a fluid manner without the sampling flow path (2) and an injecting state in which the sampling flow path (2) is interposed between the analysis mobile phase supply flow path (6) and the analysis flow path (4) when a tip end of the needle (12) is inserted into the injection port (16), and a controller (50) configured to execute, when a predetermined condition is satisfied, the cleaning operation of supplying the mobile phase and the cleaning solution to the analysis flow path (4) and/or the sampling flow path (2) to temporally change the composition of liquid flowing in the analysis flow path (4) and/or the sampling flow path (2).

19 Claims, 8 Drawing Sheets

(51) Int. Cl.
    *B01D 15/18*     (2006.01)
    *B08B 9/032*     (2006.01)
    *G01N 30/22*     (2006.01)
    *G01N 30/02*     (2006.01)

(52) U.S. Cl.
    CPC ........ *G01N 30/22* (2013.01); *B08B 2209/032* (2013.01); *G01N 2030/027* (2013.01)

(58) Field of Classification Search
    USPC .................................................... 134/95.1
    See application file for complete search history.

(56) References Cited

U.S. PATENT DOCUMENTS

| | | | | |
|---|---|---|---|---|
| 8,496,836 B2 * | 7/2013 | Aumann | ............ | B01D 15/1828 210/659 |
| 8,770,046 B2 * | 7/2014 | Maeda | .................. | G01N 30/24 73/863.01 |
| 9,638,674 B2 * | 5/2017 | Morikawa | ............. | G01N 30/24 |
| 10,175,210 B2 * | 1/2019 | Vorm | .................. | B01D 15/163 |
| 10,302,604 B2 * | 5/2019 | Ogawa | .................. | G01N 30/50 |
| 10,722,816 B2 * | 7/2020 | Hochgraeber | ......... | G01N 30/34 |
| 11,460,454 B2 * | 10/2022 | Aumann | ............ | B01D 15/1864 |
| 11,624,735 B2 * | 4/2023 | Hollnagel | ............. | G01N 30/22 73/61.55 |
| 11,821,879 B2 * | 11/2023 | Fujita | .................... | G01N 30/88 |
| 11,953,472 B2 * | 4/2024 | Wachinger | ............. | G01N 30/60 |
| 12,025,631 B2 * | 7/2024 | Inoue | .................... | B05C 17/005 |
| 2013/0333452 A1 * | 12/2013 | Suzuki | .................. | G01N 30/24 73/64.56 |
| 2016/0274069 A1 | 9/2016 | Fujita | | |
| 2021/0123891 A1 * | 4/2021 | Ciavarini | ............... | G01N 30/32 |
| 2022/0049206 A1 * | 2/2022 | Rathore | ................ | C12M 41/44 |

* cited by examiner

FIG. 4
STREAM CLEANING

LIQUID CHROMATOGRAPH AND FLOW PATH CLEANING METHOD IN LIQUID CHROMATOGRAPH

BACKGROUND OF THE INVENTION

1. Technical Field

The present invention relates to a liquid chromatograph and a flow path cleaning method in the liquid chromatograph.

2. Background Art

In some cases, in a liquid chromatograph, after sample analysis has ended, a mobile phase composition is changed from a final state in previous analysis, and then, subsequent sample analysis is performed. In this case, after analysis has ended, conditioning for adjusting the mobile phase composition in all paths in which a sample flows to an initial state in subsequent analysis needs to be performed (see JP-A-2016-173256).

For ensuring reliability of an analysis result in the case of analyzing multiple samples, it is important that so-called carry-over that a previous sample remains in a system at the start of subsequent sample analysis is not caused. For this reason, a method in which blank injection for injecting a blank solution containing no sample into an analysis flow path is performed or solutions including a mobile phase are simultaneously applied to a flow path to clean the flow path is, during conditioning or after the end of conditioning, generally performed as both of checking whether or not a ghost peak due to the carry-over has been caused and flow path cleaning. A carry-over occurrence location and a carry-over amount depend on sample type and concentration or analysis conditions. In the case of injecting a high-concentration sample, cleaning cannot be sufficiently performed only by single blank injection, and the blank injection needs to be performed multiple times in some cases. Occurrence of downtime due to such cleaning significantly degrades throughput performance of the liquid chromatograph, and for this reason, countermeasures for building a method achieving low carry-over and quickly eliminating the carry-over upon occurrence thereof have been demanded.

SUMMARY OF THE INVENTION

Thus, the present invention has been made in view of the above-described problems, and an object of the present invention is to propose a liquid chromatograph and an analysis liquid chromatograph cleaning method capable of cleaning a system upon occurrence of carry-over and quickly reducing/eliminating the carry-over.

The inventor(s) of the present invention has found two approaches for enhancing the effect of cleaning the inside of the flow path. The present invention is based on these two approaches.

The first approach is that a cleaning solution as liquid different from a mobile phase used for analysis is used in combination of the mobile phase upon cleaning of the inside of a flow path to temporally change the composition of liquid flowing in the flow path. The cleaning solution is selected according to sample properties. The inventor(s) of the present invention has conducted study on cleaning of the inside of the flow path by means of the cleaning solution alone, but has found that a higher carry-over elimination effect is obtained not in such a manner that cleaning by the cleaning solution alone is added to processing after analysis, but in such a manner that cleaning is performed after the composition of liquid flowing in the flow path has been temporally changed by a combination of the cleaning solution and the mobile phase. In experiment of the inventor(s) of the present invention, it has been confirmed that blank solution injection (blank injection) needs to be performed ten times or more for achieving evaluation (LOQ (%)>10) that the carry-over is sufficiently eliminated in a case where the analysis flow path is cleaned only by the cleaning solution after the end of analysis, whereas the blank injection is performed about four times to achieve sufficient carry-over elimination (LOQ (%)>10) when the cleaning is, after the end of analysis, performed in such a manner that the composition of liquid flowing in the analysis flow path is temporally changed by the combination of the cleaning solution and the mobile phase.

The second approach is that the internal pressure of the flow path is temporarily decreased. Generally, in the liquid chromatograph, the mobile phase continuously flows in the analysis flow path even after the end of analysis, and accordingly, the inside of the flow path is in a high-pressure state. Thus, a remaining component in the flow path is in a state in which such a component strongly sticks to a flow path wall surface with a high pressure. It is assumed that in this state, when the internal pressure of the flow path is temporarily decreased, the force of sticking the remaining component to the flow path wall surface is weakened, and thereafter, the remaining component is easily removable by application of the mobile phase or the cleaning solution. In the experiment conducted by the inventor(s) of the present invention, a result that the carry-over elimination effect is improved by application of the mobile phase or the cleaning solution after the internal pressure of the analysis flow path has been temporarily decreased during or after cleaning of the inside of the analysis flow path has been also obtained.

A liquid chromatograph according to the first approach of the present invention includes at least one mobile phase supply flow path for supplying a mobile phase, the at least one mobile phase supply flow path including an analysis mobile phase supply flow path for supplying an analysis mobile phase; at least one cleaning solution supply flow path joining the mobile phase supply flow path to supply a cleaning solution as liquid having properties different from those of the mobile phase; an analysis flow path provided with a separation column for separating a component in a sample; a sampling flow path provided, at a tip end thereof, with a sampling needle moving three-dimensionally and performing liquid suction from a tip end thereof; a switcher including a high-pressure valve having an injection port connected to the sampling flow path by insertion of the tip end of the needle into the injection port and configured to switch a flow path configuration of the liquid chromatograph between a loading state in which the analysis mobile phase supply flow path and the analysis flow path are connected in a fluid manner without the sampling flow path and an injecting state in which the sampling flow path is interposed between the analysis mobile phase supply flow path and the analysis flow path when the tip end of the needle is inserted into the injection port; and a controller configured to control the operation of supplying the mobile phase through the mobile phase supply flow path, the operation of supplying the cleaning solution through the cleaning solution supply flow path, operation of the needle, and operation of the switcher and execute, when predetermined conditions are satisfied, the cleaning operation of supplying the mobile phase and the cleaning solution to the analysis flow path and/or the sampling flow path to temporally change the composition of liquid flowing in the analysis flow path and/or the sampling flow path.

A liquid chromatograph according to the second approach of the present invention includes a mobile phase supply flow path for supplying a mobile phase; an analysis flow path provided with a separation column for separating a component in a sample; a sampling flow path provided, at a tip end thereof, with a sampling needle moving three-dimensionally and performing liquid suction from a tip end thereof; a switcher including a high-pressure valve having an injection port connected to the sampling flow path by insertion of the tip end of the needle into the injection port and configured to switch a flow path configuration of the liquid chromatograph between a loading state in which the mobile phase supply flow path and the analysis flow path are connected in a fluid manner without the sampling flow path and an injecting state in which the sampling flow path is interposed between the mobile phase supply flow path and the analysis flow path when the tip end of the needle is inserted into the injection port; and a controller configured to control the operation of supplying the mobile phase through the mobile phase supply flow path, operation of the needle, and operation of the switcher and execute, when predetermined conditions are satisfied before subsequent sample analysis is started and after sample analysis has ended, pressure release for stopping a supply of the mobile phase to the analysis flow path to decrease a pressure at a portion upstream of the separation column in the analysis flow path.

A flow path cleaning method according to the first approach of the present invention is a flow path cleaning method in a liquid chromatograph including an analysis flow path provided with a separation column for separating a component in a sample and a sampling flow path provided, at a tip end thereof, with a needle injecting the sample into the analysis flow path. The method includes the cleaning step of supplying a mobile phase and a cleaning solution having properties different from those of the mobile phase to the analysis flow path and/or the sampling flow path to temporally change the composition of liquid flowing in the analysis flow path and/or the sampling flow path.

A flow path cleaning method according to the second approach of the present invention is a flow path cleaning method in a liquid chromatograph including an analysis flow path provided with a separation column for separating a component in a sample. The method includes the pressure release step of stopping a supply of a mobile phase to the analysis flow path in a state in which a pressure at a portion upstream of the separation column in the analysis flow path is higher than an atmospheric pressure to decrease the pressure at the upstream portion.

In the liquid chromatograph according to the first approach of the present invention, the cleaning solution supply flow path is added as compared to the typical configuration. Thus, the cleaning operation of supplying the mobile phase and the cleaning solution to the analysis flow path and/or the sampling flow path to temporally change the composition of liquid flowing in the analysis flow path and/or the sampling flow path can be executed as necessary, e.g., after analysis of a high-concentration sample. With this configuration, the efficiency of cleaning the analysis flow path and/or the sampling flow path can be improved, carry-over can be efficiently reduced, and time required for reducing the carry-over can be shortened.

In the liquid chromatograph according to the second approach of the present invention, it is configured such that when the predetermined conditions are satisfied before the subsequent sample analysis is started and after sample analysis has ended, the pressure release for stopping the supply of the mobile phase to the analysis flow path to decrease the pressure at the portion upstream of the separation column in the analysis flow path is executed. Thus, e.g., after analysis of the high-concentration sample, the internal pressure of the analysis flow path is, as necessary, temporarily decreased to enhance the carry-over elimination effect. Thus, the efficiency of cleaning the analysis flow path is improved. With this configuration, the carry-over can be efficiently reduced, and the time required for reducing the carry-over can be shortened.

The flow path cleaning method according to the first approach of the present invention includes the cleaning step of supplying the mobile phase and the cleaning solution to the analysis flow path and/or the sampling flow path to temporally change the composition of liquid flowing in the analysis flow path and/or the sampling flow path. With this configuration, the efficiency of cleaning the analysis flow path and/or the sampling flow path can be improved, the carry-over can be efficiently reduced, and the time required for reducing the carry-over can be shortened.

The flow path cleaning method according to the second approach of the present invention includes the pressure release step of stopping the supply of the mobile phase to the analysis flow path in a state in which the pressure at the portion upstream of the separation column in the analysis flow path is higher than the atmospheric pressure to decrease the pressure at the upstream portion. Thus, the efficiency of cleaning the analysis flow path is improved. With this configuration, the carry-over can be efficiently reduced, and the time required for reducing the carry-over can be shortened.

DETAILED DESCRIPTION OF THE EXEMPLARY EMBODIMENTS

Hereinafter, an embodiment of a liquid chromatograph and a flow path cleaning method according to the present invention will be described with reference to the drawings.

Figure 1:
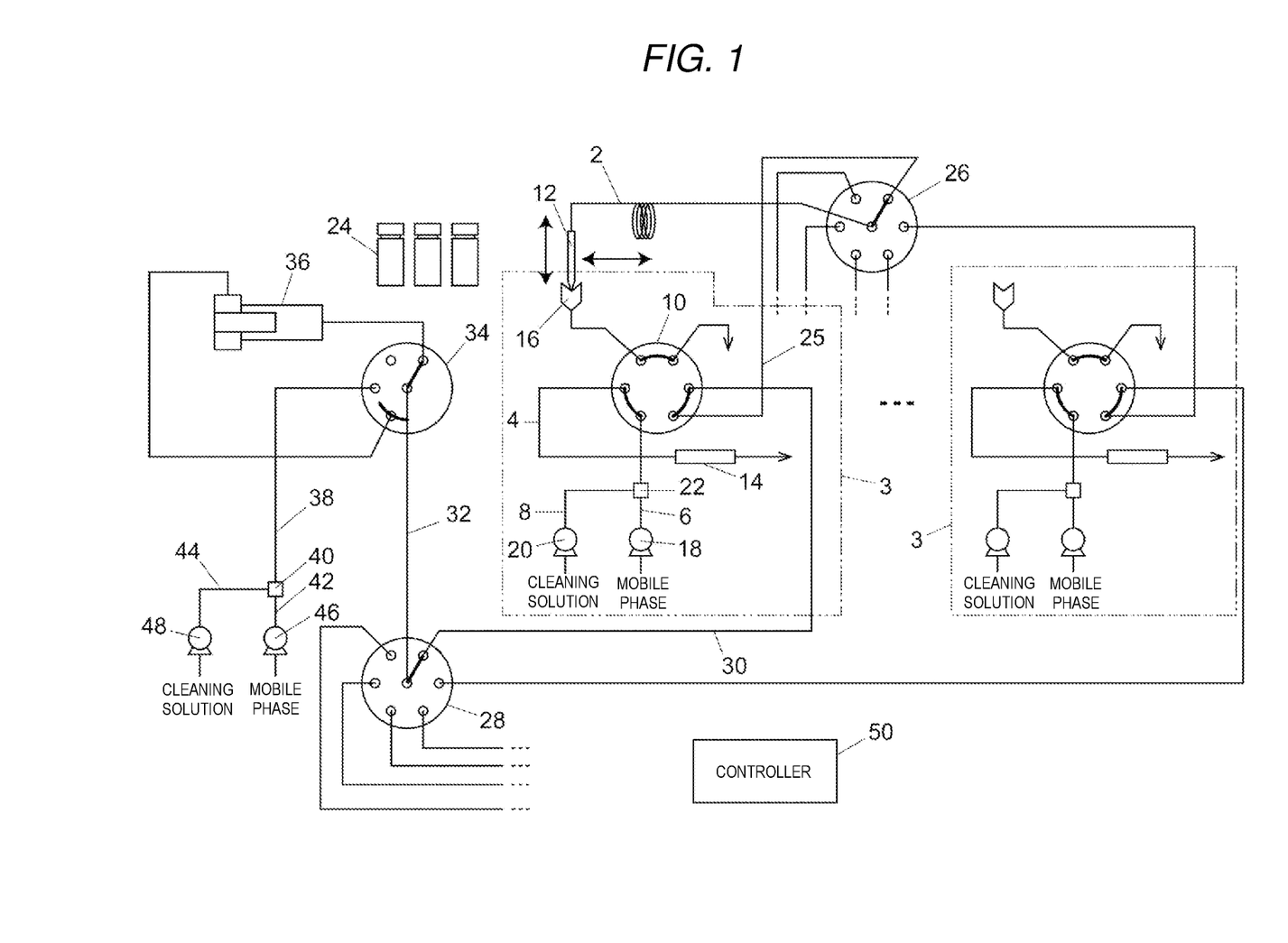
FIG. 1 is a configuration diagram illustrating one embodiment of a liquid chromatograph.

First, one embodiment of the liquid chromatograph will be first described using FIG. 1. Note that a multiplex LCMS including multiple separators 3 configured to perform separation for a sample and configured so that separation and analysis for the sample can be simultaneously executed in parallel will be described herein as an example, but the present invention is not limited to such an example. The present invention is also similarly applicable to a liquid chromatograph provided only with a single analyzer.

The liquid chromatograph of this embodiment includes a single sampling flow path 2, the multiple separators 3, selection valves 26, 28, a low-pressure valve 34, a metering pump 36, and a controller 50.

A base end of the sampling flow path 2 is connected to a common port of the selection valve 26, and the sampling flow path 2 includes a sampling needle 12 at a tip end. The needle 12 is three-dimensionally operated by a not-shown movement mechanism, and the base end of the sampling flow path 2 is connected to the metering pump 36 in a fluid manner so that the sampling flow path 2 can, through the tip end thereof, suck and hold a sample housed in a sample container 24 arranged at a predetermined position. Further, the needle 12 can move to the position of an injection port 16 provided at each separator 3. A tip end of the needle 12 is inserted into the injection port 16 of the desired separator 3 so that the sampling flow path 2 can be connected to a flow path of the separator 3 in a fluid manner.

In the figures, reference numerals are assigned to only one separator 3 of the multiple separators 3, but the separators 3 have the same configuration. Hereinafter, one separator 3 will be described as a representative.

The separator 3 includes an analysis flow path 4, a mobile phase supply flow path 6 (an analysis mobile phase supply flow path), a cleaning solution supply flow path 8, and a high-pressure valve 10. The high-pressure valve 10 is a two-position valve including six ports on the same circumference and configured to switch a connection state between adjacent ones of the ports. One port of the high-pressure valve 10 communicates with the injection port 16. One of the ports adjacent to the port communicating with the injection port communicates with a drain, and the other port is connected to an upstream end of the analysis flow path 4. The mobile phase supply flow path 6 is connected to the port positioned on the opposite side of the port connected to the upstream end of the analysis flow path 4 from the port communicating with the injection port 16. The remaining two ports of the high-pressure valve 10 are each connected to flow paths 25, 30. The flow path 25 is connected to one selection port of the selection valve 26, and the flow path 30 is connected to one selection port of the selection valve 28.

The analysis flow path 4 includes a separation column 14 configured to separate a component in the sample. Although not shown in the figure, the analysis flow path 4 communicates with a mass spectrometer (MS) as a detector configured to detect the component separated in the separation column 14. The mobile phase supply flow path 6 is a flow path for supplying an analysis mobile phase. The cleaning solution supply flow path 8 is a flow path for supplying a cleaning solution as liquid having properties different from those of the analysis mobile phase, and joins the mobile phase supply flow path 6 through a switching valve 22. The mobile phase supply flow path 6 includes a mobile phase pump 18 configured to deliver the analysis mobile phase, and the cleaning solution supply flow path 8 includes a cleaning solution pump 20 configured to deliver the cleaning solution.

Note that the mobile phase supply flow path 6 and the cleaning solution supply flow path 8 each separately include the pumps 18, 20, but may be configured such that switching to any of the mobile phase and the cleaning solution is made by a switching valve and the mobile phase or the cleaning solution is supplied by a common pump. The figures illustrate that only a single type of mobile phase is supplied by the mobile phase supply flow path 6, but it may be configured so that multiple types of mobile phases can be simultaneously supplied or can be switched and supplied. Similarly, it may be configured so that multiple types of cleaning solutions can be simultaneously supplied or can be switched and supplied through the cleaning solution supply flow path 8. The switching valve 22 is provided at a joint portion between the mobile phase supply flow path 6 and the cleaning solution supply flow path 8, but a mixer can be used instead of the switching valve 22.

A common port of the selection valve 28 is connected to a common port of the low-pressure valve 34 through a flow path 32. The syringe pump 36 and a delivery flow path 38 are connected to a selection port of the low-pressure valve 34. A mobile phase supply flow path 42 (a cleaning mobile phase supply flow path) and a cleaning solution supply flow path 44 are connected to the delivery flow path 38 through a switching valve 40, and the mobile phase (a cleaning mobile phase) and/or the cleaning solution are delivered through the delivery flow path 38. The mobile phase supplied through the mobile phase supply flow path 42 is the same as the mobile phase supplied through the mobile phase supply flow path 6, and the cleaning solution supplied through the cleaning solution supply flow path 44 is the same as the cleaning solution supplied through the cleaning solution supply flow path 8. Note that the mobile phase supply flow path 42 and the cleaning solution supply flow path 44 each separately include pumps 46, 48, but may be configured such that switching to any of the mobile phase and the cleaning solution is made by a switching valve and the mobile phase or the cleaning solution is supplied by a common pump.

The high-pressure valve 10 and the selection valve 26 form a switcher configured to switch a flow path configuration of the liquid chromatograph between a loading state (the state of FIG. 1) in which the mobile phase supply flow path 6 and the analysis flow path 4 are connected in a fluid manner without the sampling flow path 2 and an injecting state (the state of FIG. 2) in which the sampling flow path 2 is interposed between the mobile phase supply flow path 6 and the analysis flow path 4. When the port connected to the mobile phase supply flow path 6 and the port connected to the analysis flow path 4 are connected in a fluid manner in the high-pressure valve 10, the loading state is brought. The injecting state is brought when the needle 12 is inserted into the injection port 16, the high-pressure valve 10 having the injection port 16 into which the needle 12 is inserted is selected by the selection valve 26, the port communicating with the injection port 16 and the port connected to the analysis flow path are connected in a fluid manner in the high-pressure valve 10, and the port connected to the mobile phase supply flow path 6 and the port connected to the flow path 25 are connected in a fluid manner in the high-pressure valve 10.

The controller 50 has functions implemented in such a manner that programs are executed in an electronic circuit including a central processing unit (CPU) and an information storage device. The controller 50 is configured to control electric elements in the liquid chromatograph, thereby executing sample injection operation, needle cleaning, stream cleaning, system cleaning, and pressure release.

Figure 2:
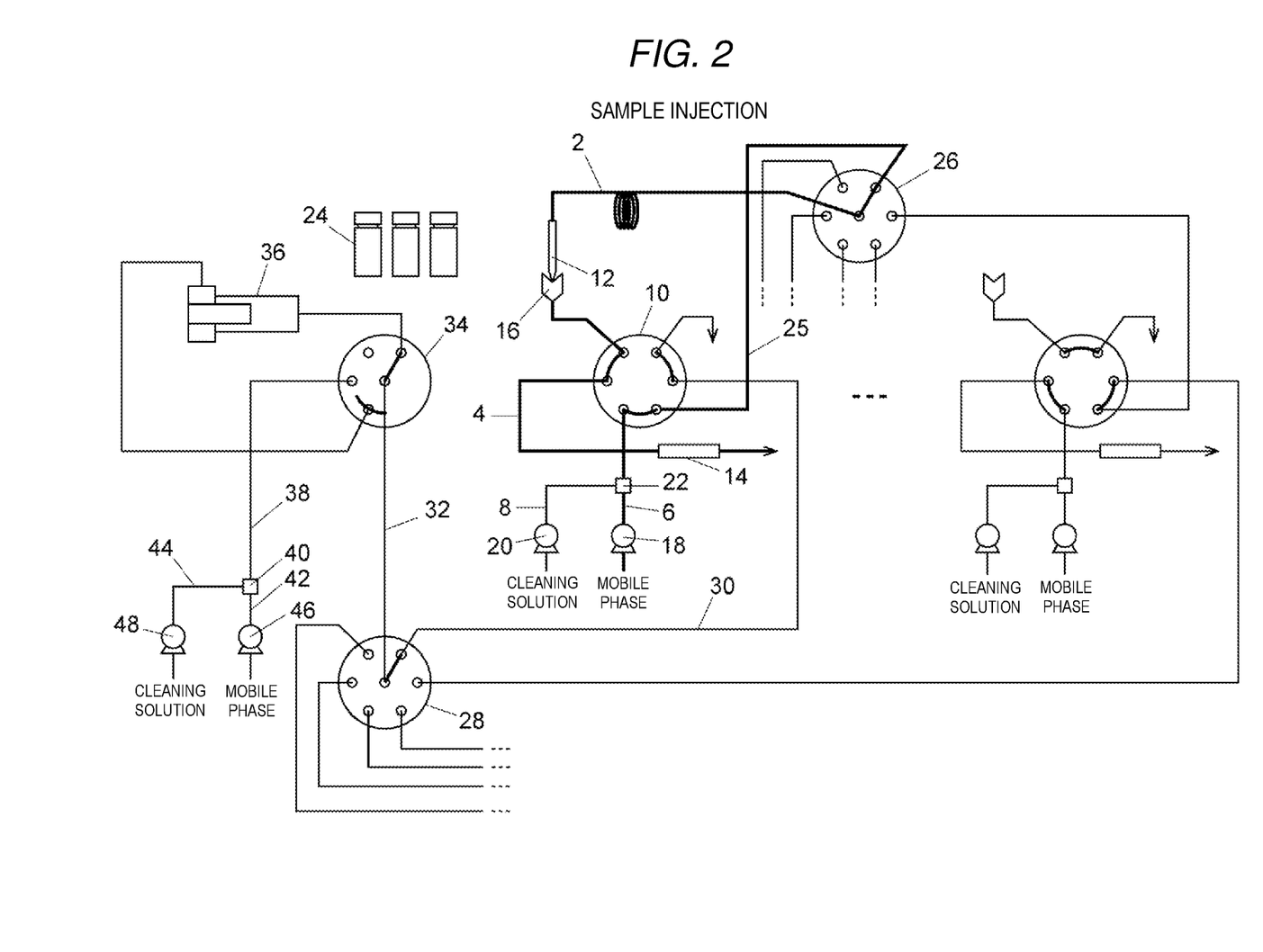
FIG. 2 is a diagram illustrating one example of a flow path configuration upon sample injection in the embodiment.

The sample injection operation is the operation of inserting, after the sample housed in the sample container 24 has been collected into the sampling flow path 2, the needle 12 into the injection port 16 to bring the flow path configuration into the injecting state, thereby supplying the mobile phase through the mobile phase supply flow path 6 as illustrated in FIG. 2. The mobile phase supplied from the mobile phase supply flow path 6 flows toward the analysis flow path 4 in the sampling flow path 2, and accordingly, the sample held in the sampling flow path 2 is, together with the mobile phase, injected into the analysis flow path 4.

Figure 3:
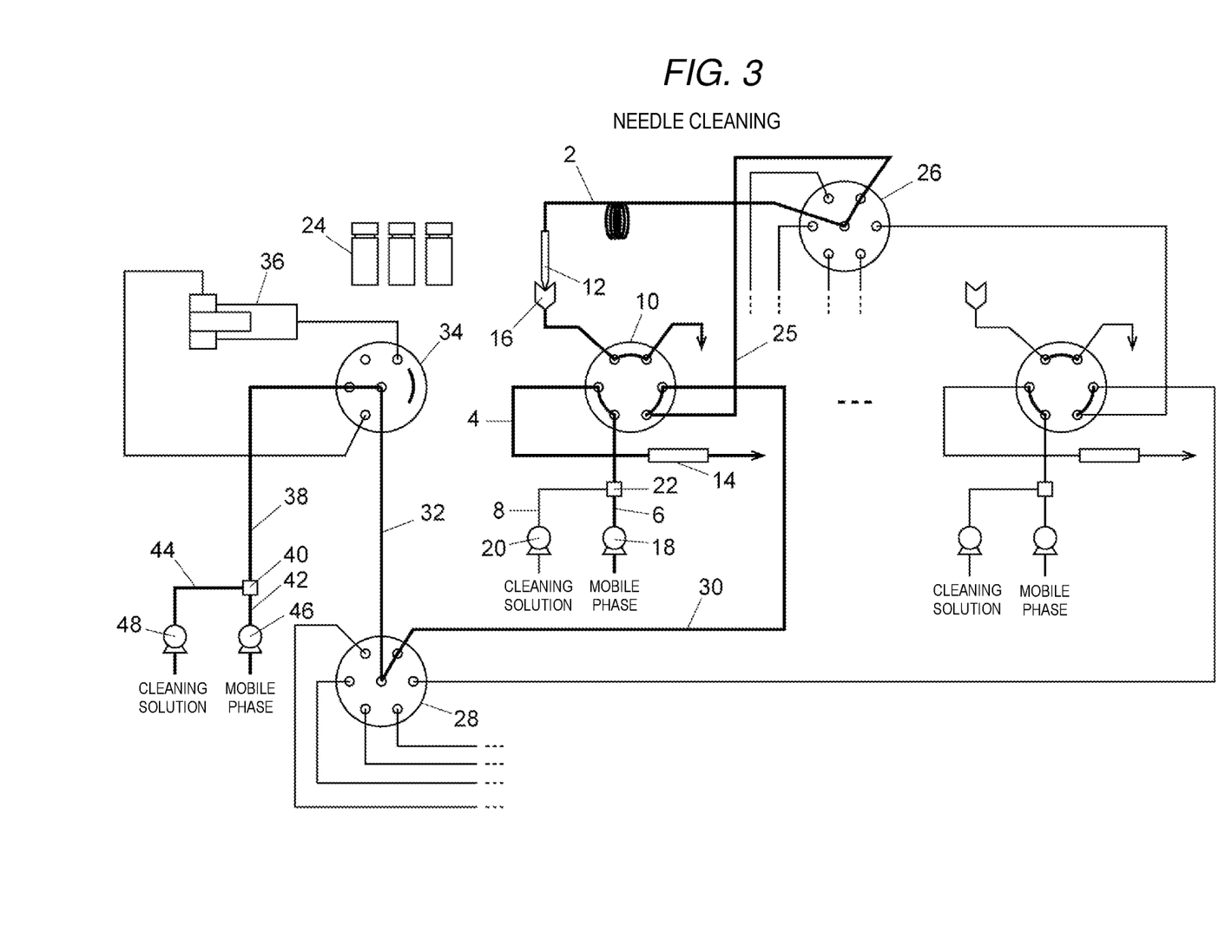
FIG. 3 is a diagram illustrating one example of the flow path configuration upon needle cleaning in the embodiment.
Figure 7:
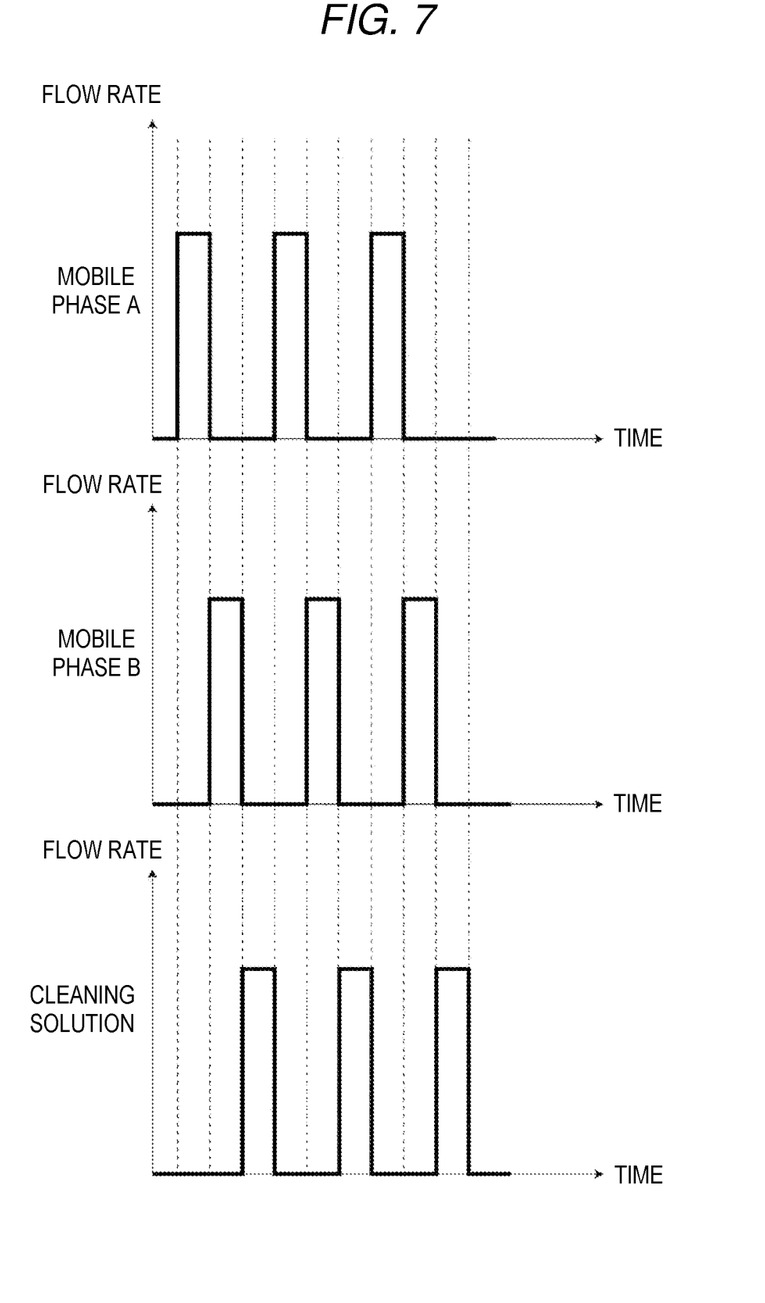
FIG. 7 is a time chart illustrating each liquid delivery state upon cleaning in the embodiment.

The needle cleaning is, as illustrated in FIG. 3, is performed in such a manner that the flow path configuration is, in a state in which the needle 12 is inserted into the injection port 16, brought into the loading state to disconnect the sampling flow path 2 from the analysis flow path 4 and the mobile phase from the mobile phase supply flow path 42 and the cleaning solution from the cleaning solution supply flow path 44 are supplied to the sampling flow path 2. In the needle cleaning, the composition of liquid flowing in the sampling flow path 2 is changed using the mobile phase and the cleaning solution. For example, as illustrated in FIG. 7, a stepwise method for switching liquid supplied to the sampling flow path 2 in every certain time (e.g., 0.1 to 0.5 minutes) may be employed, or a gradient method for changing each liquid concentration ratio over time may be employed. In a case where two or more types of solvents can be supplied as the mobile phases, the sampling flow path may be cleaned in such a manner that the composition of liquid flowing in the sampling flow path 2 is changed using two or more types of mobile phases and the cleaning solution.

The above-described needle cleaning can be executed anytime in a state in which the sampling flow path 2 is disconnected from the analysis flow path 4. However, the needle cleaning is executed after sample injection into the analysis flow path 4 has ended, i.e., in parallel with sample analysis in the analysis flow path 4, and therefore, the timing of subsequently injecting the sample into another separator 3 is advanced. Thus, analysis throughput can be improved. Note that the needle cleaning is not necessarily executed every time sample injection into the analysis flow path 4 is completed, and it may only be required that the needle cleaning is executed only in a case where certain conditions (first conditions) are satisfied. The conditions for executing the needle cleaning include, for example, a condition that a sample concentration is equal to or higher than a predetermined concentration and a condition that a user sets to execute the needle cleaning after sample injection. By such needle cleaning, not only the inside of the sampling flow path 2 including the needle 12 but also the inside of the injection port 16 and the inside of the flow path connecting between the injection port 16 and the high-pressure valve 10 can be cleaned.

Figure 4:
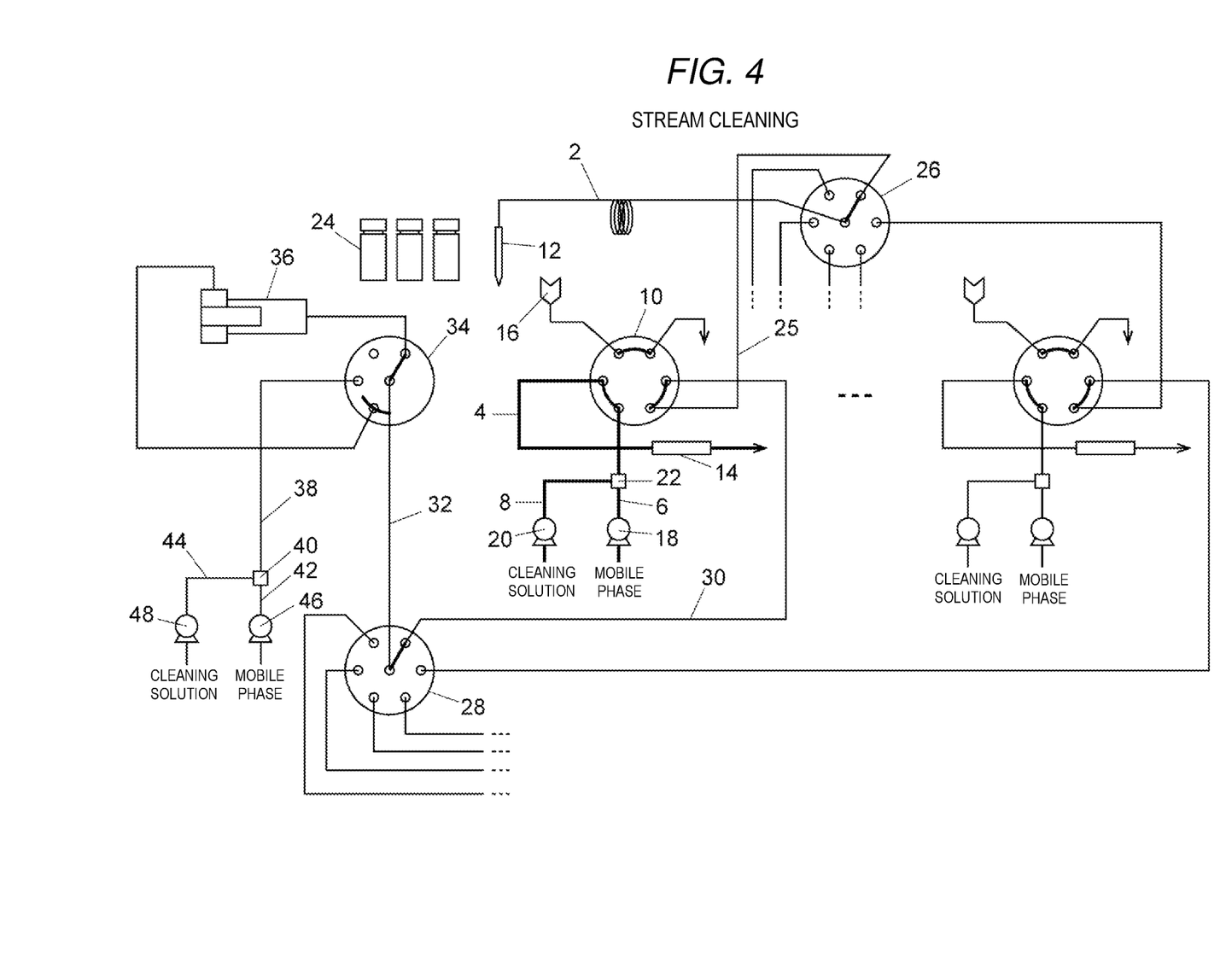
FIG. 4 is a diagram illustrating one example of the flow path configuration upon stream cleaning in the embodiment.

As illustrated in FIG. 4, the stream cleaning is performed in such a manner that the flow path configuration is brought into the loading state to disconnect the sampling flow path 2 from the analysis flow path 4 and the mobile phase and the cleaning solution are supplied from the mobile phase supply flow path 6 and the cleaning solution supply flow path 8 to the analysis flow path 4. In the stream cleaning, the composition of liquid flowing in the analysis flow path 4 is changed using the mobile phase and the cleaning solution as in the needle cleaning. In a case where two or more types of solvents can be supplied as the mobile phases, cleaning may be also performed in the stream cleaning in such a manner that the composition of liquid flowing in the analysis flow path 4 is changed using two or more types of mobile phases and the cleaning solution.

The above-described stream cleaning can be executed at optional timing after sample analysis in the analysis flow path 4 has ended (after all of analysis target compounds have been eluted from the separation column 14), such as during conditioning of the separation column 14 for subsequent analysis or after completion of conditioning. The stream cleaning is not necessarily executed every time sample analysis in the analysis flow path 4 ends, and it may only be required that the stream cleaning is executed only in a case where certain conditions (second conditions) are satisfied. The conditions for executing the stream cleaning include, for example, a case where blank injection is performed and occurrence of carry-over is detected based on a signal of the detector and a case where the user sets to execute the stream cleaning after sample analysis in addition to the case where the sample concentration is equal to or higher than the predetermined concentration.

Figure 5:
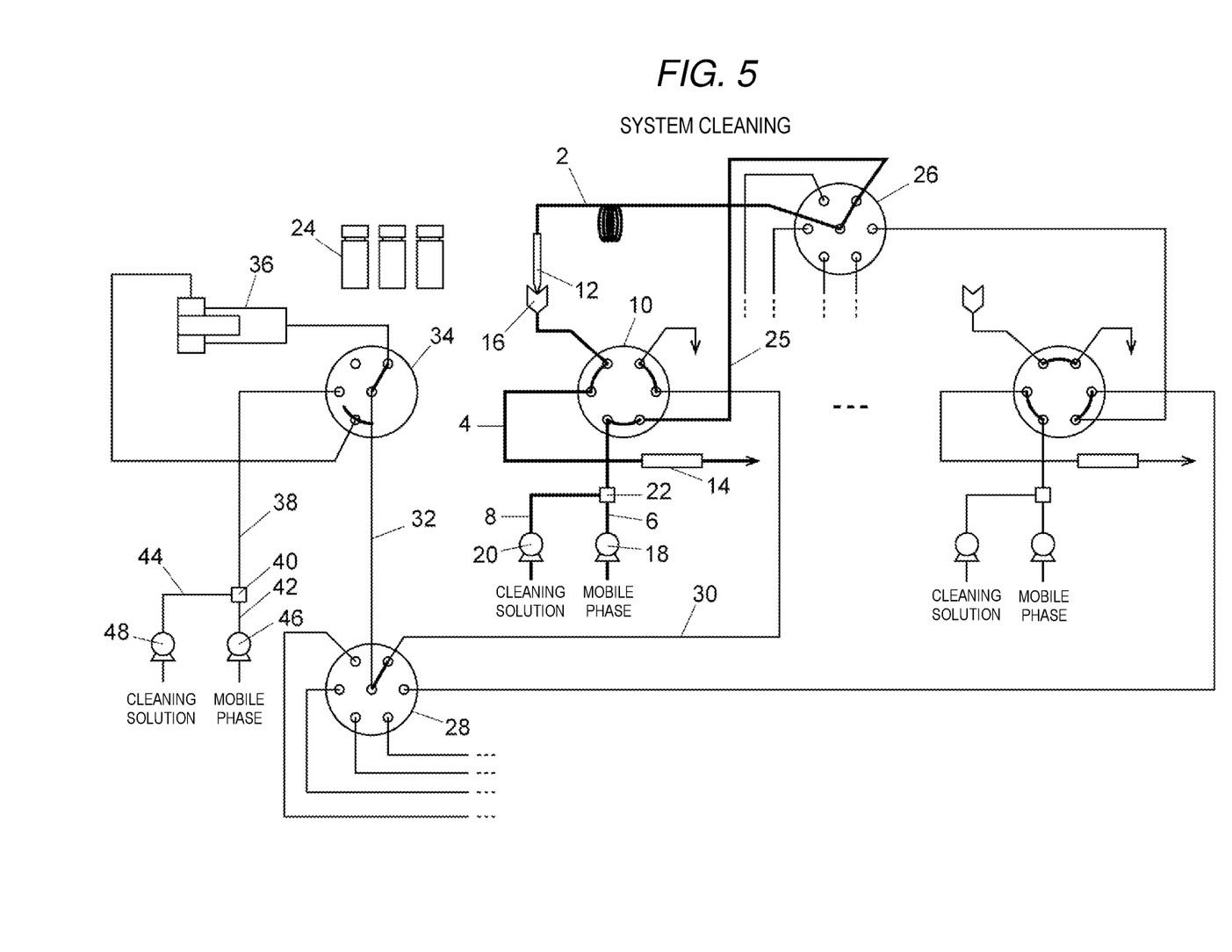
FIG. 5 is a diagram illustrating one example of the flow path configuration upon system cleaning in the embodiment.

As illustrated in FIG. 5, the system cleaning is performed in such a manner that the flow path configuration is brought into the injecting state to connect the sampling flow path 2 to the upstream of the analysis flow path 4 in a fluid manner and the mobile phase and the cleaning solution are supplied from the mobile phase supply flow path 6 and the cleaning solution supply flow path 8 to the sampling flow path 2 and the analysis flow path 4. In the system cleaning, the composition of liquid flowing in the sampling flow path 2 and the analysis flow path 4 is changed using the mobile phase and the cleaning solution as in the needle cleaning and the stream cleaning. In a case where two or more types of solvents can be supplied as the mobile phases, cleaning may be also performed in the system cleaning in such a manner that the composition of liquid flowing in the sampling flow path 2 and the analysis flow path 4 is changed using two or more types of mobile phases and the cleaning solution.

The above-describe system cleaning can be executed in addition to or instead of the stream cleaning at optional timing after sample analysis in the analysis flow path 4 has ended. In the system cleaning, cleaning can be performed in such a manner that the mobile phase and the cleaning solution are sent to between the port communicating with the injection port 16 and the port connected to the analysis flow path 4 in the high-pressure valve 10. The system cleaning is not necessarily executed every time sample analysis in the analysis flow path 4 ends, and it may only be required that the system cleaning is executed only in a case where certain conditions (third conditions) are satisfied. The conditions for executing the system cleaning include, for example, the case where the sample concentration detected by the detector is equal to or higher than the predetermined concentration and a case where the user sets to execute the system cleaning after sample analysis.

When the detector detects whether or not the sample concentration is equal to or higher than the predetermined concentration, determination can be, as one example, made based on whether or not a signal intensity of a total ion chromatogram (TIC) produced based on mass spectrum data collected by a mass analysis device satisfies a predetermined threshold.

The pressure release is performed in such a manner that a supply of the mobile phase and the cleaning solution to the analysis flow path 4 is stopped and the internal pressure of the analysis flow path 4 is temporarily decreased to, e.g., an atmospheric pressure. The pressure release is not necessarily executed every time sample analysis in the analysis flow path 4 ends, and it may only be required that the pressure release is executed only in a case where certain conditions (fourth conditions) are satisfied. The conditions for executing the pressure release include, for example, the case where the sample concentration is equal to or higher than the predetermined concentration and a case where the user sets to execute the pressure release. The pressure release can be performed at optional timing after sample analysis in the analysis flow path 4 has ended, and may be performed during, before, or after execution of the above-described stream cleaning and/or the above-described system cleaning.

A series of operation regarding analysis implemented by the controller 50 will be described using FIGS. 1 to 5 and a flowchart of FIG. 6.

When sample analysis is started, the controller 50 collects the sample from the sample container 24 by the needle 12 (a step 101), and inserts the needle 12 into the injection port 16 to switch the flow path configuration to the injecting state as in FIG. 2 (a step 102). After a lapse of predetermined time since the flow path configuration is switched to the injecting state, the controller 50 determines that the entirety of the sample held in the sampling flow path 2 has been injected into the analysis flow path 4 (sample injection has been completed) (a step 103), and returns the flow path configuration to the loading state (the state of FIG. 1).

After completion of sample injection (the step 103), the controller 50 determines whether or not the needle cleaning is to be executed (a step 104). As necessary, the controller 50 executes the needle cleaning (a step 105). The case of executing the needle cleaning is the case where the predetermined conditions are satisfied, such as the case where the sample has a high concentration of equal to or higher than the predetermined concentration.

Then, after sample analysis in the analysis flow path 4 has ended (a step 106), the controller 50 determines, based on the detector signal obtained by analysis, sample information input in advance by the user, or the like, whether or not the stream cleaning is to be executed (a step 107), whether or not the system cleaning is to be executed (a step 109), whether or not the pressure release is to be executed (a step 111), and whether or not the blank injection is to be executed (a step 113). The controller 50 executes the processing which needs to be executed (steps 108, 110, 112, 114). Note that in the case of executing the system cleaning (the step 110), the needle 12 needs to wait without executing sample injection into another separator 3 until at least analysis in the analysis flow path 4 ends. On the other hand, in the case of not executing the system cleaning, the carry-over can be eliminated by, e.g., the needle cleaning (the step 105) after sample injection into the analysis flow path 4 has been completed, and then, sample injection into the subsequent separator 3 can be executed. Thus, the analysis throughput is improved.

The blank injection is the operation of collecting a blank solution (e.g., a solvent) containing no sample by means of the needle 12 to inject the blank solution into the analysis flow path 4 through the injection port 16 as in the normal sample. The blank injection is executed so that a carry-over component remaining in the path, through which the sample passes, from the sampling flow path 2 to the analysis flow path 4 can be washed away to some extent. Moreover, the blank injection is executed so that it can be, based on the detector signal, checked how much carry-over component remains in the path. As a result of the blank injection, in a case where it is determined that elimination of the carry-over is insufficient, one or more types of processing including the needle cleaning, the stream cleaning, the system cleaning, the pressure release, and the blank injection may be further executed. The user may determine, based on the detector signal after the blank injection, whether or not elimination of the carry-over is sufficient, or the controller 50 may make determination by comparison of the detector signal after the blank injection with a predetermined threshold.

Figure 6:
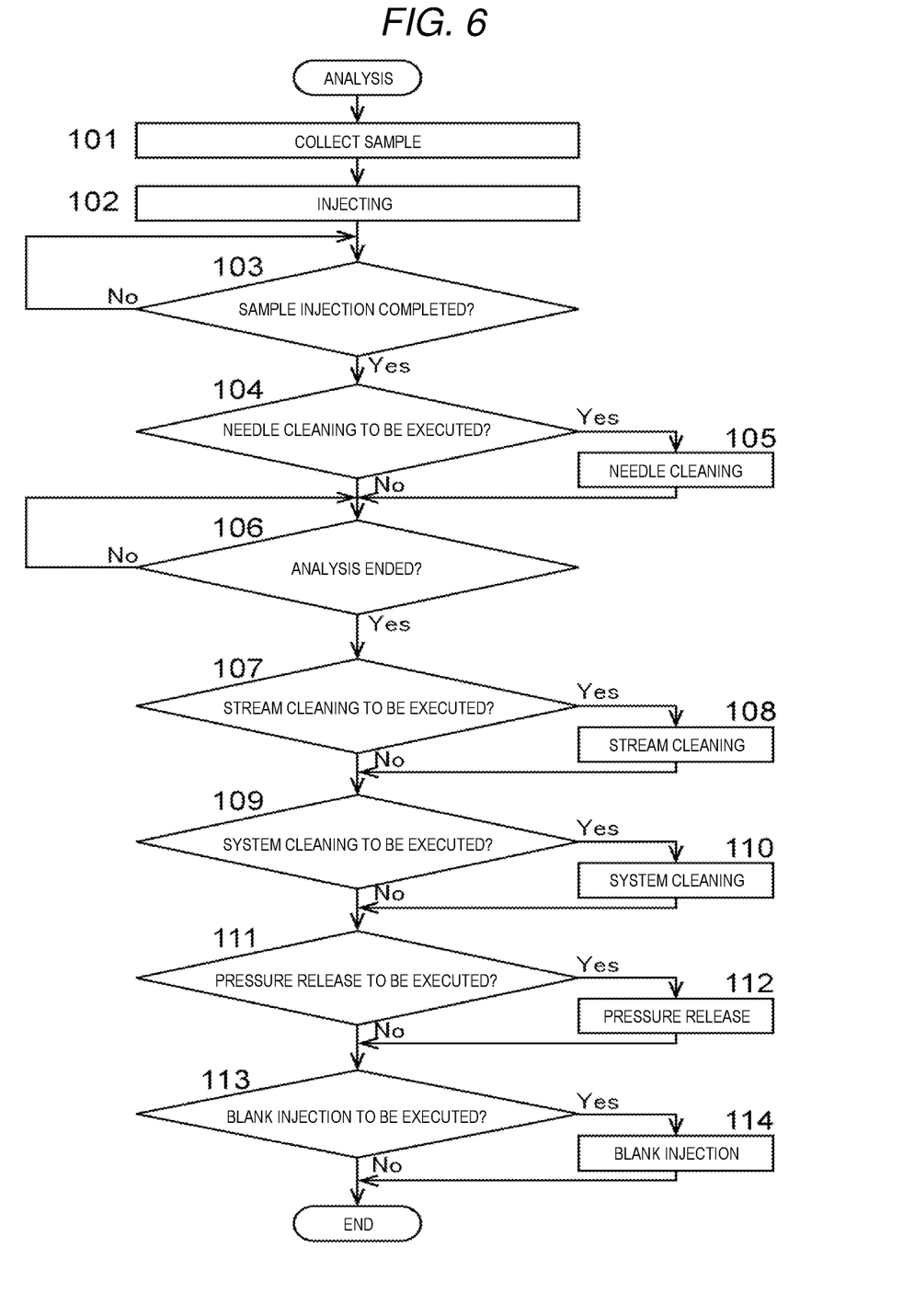
FIG. 6 is a flowchart for describing one example of operation of the embodiment.

Note that the order of the processing illustrated in FIG. 6 and the number of times of such processing are merely an example, and can be freely changed as necessary. For example, the blank injection may be executed only once right after sample analysis in the analysis flow path 4 has ended, and based on the detector signal obtained by such blank injection, it may be determined whether or not the stream cleaning, the system cleaning, and the pressure release are to be executed. Alternatively, cleaning operation using only the cleaning solution may be incorporated before execution of the stream cleaning or the system cleaning.

Figure 8:
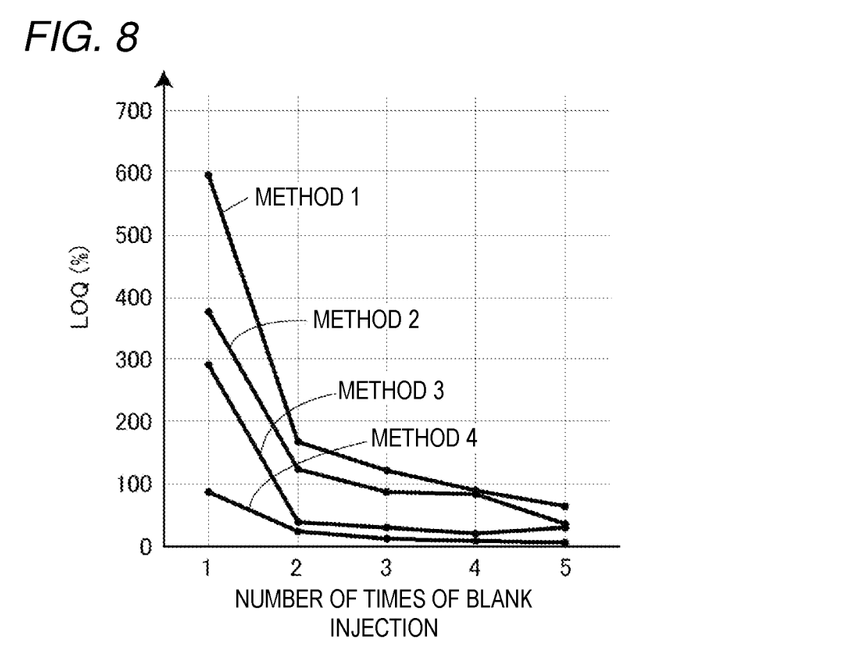
FIG. 8 is a graph illustrating verification results of a carry-over elimination effect by the stream cleaning and the system cleaning.

FIG. 8 is a graph illustrating verification results of a carry-over elimination effect by the stream cleaning and the system cleaning. In such verification, two types of solvents (a mobile phase A and a mobile phase B) were used as the mobile phases, and an LOQ was obtained using the detector (the mass spectrometer) signal in the blank injection after analysis for a predetermined sample with such a high concentration that the carry-over occurs. In each of the needle cleaning, the stream cleaning, and the system cleaning, the cleaning solution was used in addition to the above-described mobile phases A, B, and the composition of liquid flowing in the sampling flow path 2 and/or the analysis flow path 4 was switched at an interval of 0.5 minutes in the order of the mobile phase B, the mobile phase A, and the cleaning solution by the stepwise method as in FIG. 7. Examples of solutions used as the mobile phase A, the mobile phase B, and the cleaning solution include formic acid, ammonium formate, methanol, acetonitrile, acetone, and water, and these solutions may be mixed with a predetermined concentration and such a mixture may be used. The solutions used as the mobile phase A, the mobile phase B, and the cleaning solution are selected as necessary according to the type and concentration of the sample targeted for analysis and analysis conditions (e.g., a column, an injection amount, a flow rate, and a pipe type). Moreover, the LOQ was calculated based on a standard deviation.

In verification of FIG. 8, in a method 1, the needle cleaning is performed after sample injection into the analysis flow path 4 has ended, and the blank injection is performed without performing the stream cleaning and the system cleaning after analysis has ended. In a method 2, the needle cleaning is performed after sample injection into the analysis flow path 4 has ended, the system cleaning is performed, and thereafter, the blank injection is performed. In a method 3, the needle cleaning after sample injection into the analysis flow path 4 has ended and the stream cleaning after analysis has ended are performed, and thereafter, the blank injection is performed. In a method 4, the needle cleaning after sample injection into the analysis flow path 4 has ended and the stream cleaning and the system cleaning after analysis has ended are performed, and thereafter, the blank injection is performed.

The carry-over caused upon analysis of the high-concentration sample varies according to the sample type and concentration, but averagely, a percentage derived from the sampling flow path 2 is 20% and a percentage derived from the analysis flow path 4 is 80%. Thus, the results of the method 1 of FIG. 8 seem that the carry-over elimination effect is low. This is because the carry-over derived from the analysis flow path 4 is not eliminated only by the needle cleaning. Comparison among the results of the method 1 and the method 2 shows that the carry-over derived from the sampling flow path 2 and the carry-over derived from the analysis flow path 4 are reduced by the system cleaning and a high carry-over elimination effect can be obtained as a whole. Moreover, the results of the method 3 show that a sufficiently-high carry-over elimination effect is obtained by a combination of the needle cleaning and the stream cleaning and a higher carry-over elimination effect is obtained by a combination of the stream cleaning and the system cleaning. In the methods 3 and 4, the LOQ decreases to equal to or lower than 10 by the blank injection performed four times, and the carry-over can be sufficiently eliminated.

Figure 9:
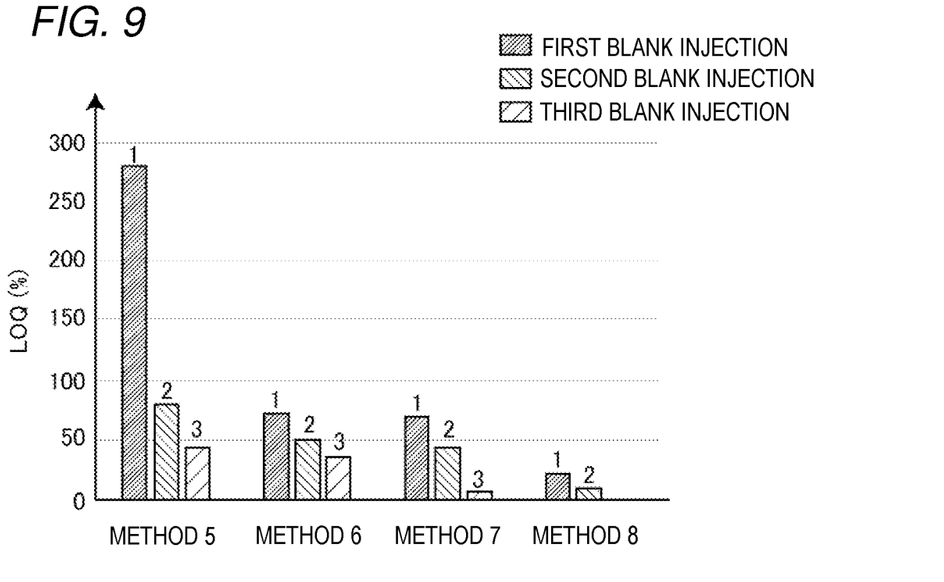
FIG. 9 is a graph illustrating verification results of a carry-over elimination effect by the stream cleaning and pressure release.

FIG. 9 is a graph illustrating verification results of the carry-over elimination effect by the stream cleaning and the pressure release. In such verification, two types of solvents (the mobile phase A, the mobile phase B) were also used as the mobile phases, and the LOQ was obtained using the detector (the mass spectrometer) signal in the blank injection after analysis for the sample with such a high concentration that the carry-over occurs. In the stream cleaning, the cleaning solution was used in addition to the above-described mobile phases A, B, and liquid flowing in the analysis flow path 4 was switched at an interval of 0.5 minutes in the order of the mobile phase B, the mobile phase A, and the cleaning solution. Examples of the solutions used as the mobile phase A, the mobile phase B, and the cleaning solution include formic acid, ammonium formate, methanol, acetonitrile, acetone, and water, and these solutions may be mixed with the predetermined concentration and such a mixture may be used. The solutions used as the mobile phase A, the mobile phase B, and the cleaning solution are selected as necessary according to the type and concentration of the sample targeted for analysis and the analysis conditions (e.g., the column, the injection amount, the flow rate, and the pipe type). In the pressure release, pressure on the mobile phase pump 18 and the cleaning solution pump 20 was decreased to the atmospheric pressure.

In verification of FIG. 9, in a method 5, the blank injection is performed three times right after analysis has ended. In a method 6, the blank injection is performed three times after a stream cleaning of 9.4 minutes has been performed twice after the end of analysis. In a method 7, the blank injection is performed twice after the stream cleaning has been performed for 9.4 minutes after the end of analysis, and then, is performed once after the pressure release has been executed. In a method 8, the stream cleaning is performed for 9.4 minutes after analysis has ended, and then, the blank injection is performed twice after the pressure release has been executed.

Comparison among the results of the methods 5 and 6 and the methods 7 and 8 in FIG. 9 shows that the LOQ greatly decreases in the blank injection after the pressure release has been executed and the carry-over elimination effect is greatly improved by execution of the pressure release. Moreover, comparison between the method 6 and the method 8 shows that a cleaning effect is improved by a combination of the stream cleaning and the pressure release, and comparison between the method 7 and the method 8 shows that the cleaning effect is further improved by execution of the pressure release right after the stream cleaning.

Note that the embodiment described above is merely an exemplary embodiment of the liquid chromatograph and the flow path cleaning method according to the present invention. Embodiments of the liquid chromatograph and the flow path cleaning method according to the present invention are as follows.

A first embodiment of the liquid chromatograph according to the present invention includes at least one mobile phase supply flow path (6; 42) for supplying a mobile phase, the at least one mobile phase supply flow path (6; 42) including an analysis mobile phase supply flow path (6) for supplying an analysis mobile phase; at least one cleaning solution supply flow path (8; 44) joining the mobile phase supply flow path (6; 42) to supply a cleaning solution as liquid having properties different from those of the mobile phase; an analysis flow path (4) provided with a separation column (14) for separating a component in a sample; a sampling flow path (2) provided, at a tip end thereof, with a sampling needle (12) moving three-dimensionally and performing liquid suction from a tip end thereof; a switcher (10; 26) including a high-pressure valve (10) having an injection port (16) connected to the sampling flow path (2) by insertion of the tip end of the needle (12) into the injection port (16) and configured to switch a flow path configuration of the liquid chromatograph between a loading state in which the analysis mobile phase supply flow path (6) and the analysis flow path (4) are connected in a fluid manner without the sampling flow path (2) and an injecting state in which the sampling flow path (2) is interposed between the analysis mobile phase supply flow path (6) and the analysis flow path (4) when the tip end of the needle (12) is inserted into the injection port (16); and a controller (50) configured to control the operation of supplying the mobile phase through the mobile phase supply flow path (6; 42), the operation of supplying the cleaning solution through the cleaning solution supply flow path (8; 44), operation of the needle (12), and operation of the switcher (10; 26) and execute, when predetermined conditions are satisfied, the cleaning operation of supplying the mobile phase and the cleaning solution to the analysis flow path (4) and/or the sampling flow path (2) to temporally change the composition of liquid flowing in the analysis flow path (4) and/or the sampling flow path (2).

In a first aspect of the first embodiment of the liquid chromatograph, it is configured such that multiple types of mobile phases are supplied through the mobile phase supply flow path, and the controller (50) is configured to temporally change, in the cleaning operation, the composition of the liquid flowing in the analysis flow path (4) and/or the sampling flow path (2) by means of the multiple types of mobile phases and the cleaning solution.

In the first aspect, the controller (50) may be configured to switch, in the cleaning operation, the liquid supplied to the analysis flow path (4) and/or the sampling flow path (2) between the mobile phase and the cleaning solution.

In a second aspect of the first embodiment of the liquid chromatograph, the mobile phase supply flow path (6; 42) includes a mobile phase pump (18; 46) configured to deliver the mobile phase, and the cleaning solution supply flow path (8; 44) includes a cleaning solution pump (20; 48) configured to deliver the cleaning solution. The second aspect can be combined with the first aspect.

A third aspect of the first embodiment of the liquid chromatograph further includes, as a mobile phase supply flow path different from the analysis mobile phase supply flow path (6), a cleaning mobile phase supply flow path (42) for supplying a cleaning mobile phase having the same composition as that of the analysis mobile phase. One (44) of the cleaning solution supply flow paths (8; 44) joins the cleaning mobile phase supply flow path (42). When first conditions are satisfied, the controller (50) is configured to execute, as the cleaning operation, needle cleaning for supplying the cleaning mobile phase and the cleaning solution to the sampling flow path (2) after the switcher (10; 26) has switched the flow path configuration to the loading state. According to this aspect, carry-over derived from the sampling flow path including the needle can be effectively eliminated as necessary. The third aspect can be combined with the first aspect and/or the second aspect.

In a fourth aspect of the first embodiment of the liquid chromatograph, one (8) of the cleaning solution supply flow paths (8; 44) joins the analysis mobile phase supply flow path (6). When second conditions are satisfied, the controller (50) is configured to execute, as the cleaning operation, stream cleaning for supplying the analysis mobile phase and the cleaning solution to the analysis flow path (4) after the switcher (10; 26) has switched the flow path configuration to the loading state. According to this aspect, carry-over derived from the analysis flow path can be effectively eliminated as necessary. The fourth aspect can be combined with the first aspect, the second aspect, and/or the third aspect.

In the fourth aspect, the controller (50) may be configured to supply the analysis mobile phase to the analysis flow path (4) to execute the stream cleaning as part of conditioning of the separation column (14) for subsequent analysis. With this configuration, the inside of the analysis flow path can be effectively cleaned during conditioning of the separation column, and analysis throughput is improved.

In a fifth aspect of the first embodiment of the liquid chromatograph, when third conditions are satisfied, the controller (50) is configured to execute, as the cleaning operation, system cleaning for supplying the analysis mobile phase and the cleaning solution to the analysis flow path (4) and the sampling flow path (2) after the switcher (10; 26) has switched the flow path configuration to the injecting state. According to this aspect, a path in the high-pressure valve through which the sample passes when the flow path configuration is brought into the injecting state can be, as necessary, cleaned using the analysis mobile phase and the cleaning solution, and a carry-over elimination effect can be improved. The fifth aspect can be combined with the first aspect, the second aspect, the third aspect, and/or the fourth aspect.

In a sixth aspect of the first embodiment of the liquid chromatograph, the controller (50) is configured to execute, after the cleaning operation has ended, blank injection for collecting a blank solution containing no sample by the needle (12) to inject the blank solution into the analysis flow path (4) through the injection port (16). The blank injection is executed so that not only the effect of cleaning the inside of the analysis flow path and the sampling flow path can be expected, but also the effect of cleaning the inside of the analysis flow path and/or the sampling flow path can be checked. The sixth aspect can be combined with the first aspect, the second aspect, the third aspect, the fourth aspect, and/or the fifth aspect.

In a seventh aspect of the first embodiment of the liquid chromatograph, when fourth conditions are satisfied, the controller (50) is configured to execute, during, before, or after execution of the cleaning operation, pressure release for stopping a supply of the analysis mobile phase and the cleaning solution to the analysis flow path (4) to decrease a pressure upstream of the separation column (14). According to this aspect, the pressure release is executed as necessary so that the effect of cleaning the inside of the analysis flow path and/or the sampling flow path can be further enhanced.

A second embodiment of the liquid chromatograph according to present invention includes a mobile phase supply flow path (6) for supplying a mobile phase; an analysis flow path (4) provided with a separation column (14) for separating a component in a sample; a sampling flow path (2) provided, at a tip end thereof, with a sampling needle (12) moving three-dimensionally and performing liquid suction from a tip end thereof; a switcher (10; 26) including a high-pressure valve (10) having an injection port (16) connected to the sampling flow path (2) by insertion of the tip end of the needle (12) into the injection port (16) and configured to switch a flow path configuration of the liquid chromatograph between a loading state in which the mobile phase supply flow path (6) and the analysis flow path (4) are connected in a fluid manner without the sampling flow path (2) and an injecting state in which the sampling flow path (2) is interposed between the mobile phase supply flow path (6) and the analysis flow path (4) when the tip end of the needle (12) is inserted into the injection port (16); and a controller (50) configured to control the operation of supplying the mobile phase through the mobile phase supply flow path (6), operation of the needle (12), and operation of the switcher (10; 26) and execute, when predetermined conditions are satisfied before subsequent sample analysis is started and after sample analysis has ended, pressure release for stopping a supply of the mobile phase to the analysis flow path (4) to decrease a pressure at a portion upstream of the separation column (14) in the analysis flow path (4).

In the second embodiment of the liquid chromatograph, the controller (50) may be configured to execute, after the pressure release has ended, blank injection for collecting a blank solution containing no sample by the needle (12) to inject the blank solution into the analysis flow path (4) through the injection port (16). The blank injection is executed so that not only the effect of removing a carry-over component which becomes easily detachable from a flow path inner wall due to the pressure release can be expected, but also a carry-over elimination effect by the pressure release can be checked.

A first embodiment of the flow path cleaning method according to the present invention is a flow path cleaning method in a liquid chromatograph including an analysis flow path (4) provided with a separation column (14) for separating a component in a sample and a sampling flow path (2) provided, at a tip end thereof, with a needle (12) injecting the sample into the analysis flow path (4). The method includes the cleaning step of supplying a mobile phase and a cleaning solution having properties different from those of the mobile phase to the analysis flow path (4) and/or the sampling flow path (2) to temporally change the composition of liquid flowing in the analysis flow path and/or the sampling flow path.

In a first aspect of the first embodiment of the flow path cleaning method, at the cleaning step, the composition of the liquid flowing in the analysis flow path (4) and/or the sampling flow path (2) is temporally changed by means of multiple types of mobile phases and the cleaning solution.

In the first aspect, at the cleaning step, the liquid supplied to the analysis flow path (4) and/or the sampling flow path (2) may be switched between the mobile phase and the cleaning solution.

In a second aspect of the first embodiment of the flow path cleaning method, the cleaning step includes the needle cleaning step of supplying the mobile phase and the cleaning solution to the sampling flow path (2) in a state in which the analysis flow path (4) and the sampling flow path (2) do not communicate with each other in a fluid manner. According to this aspect, carry-over derived from the sampling flow path including the needle can be effectively eliminated as necessary. The second aspect can be combined with the first aspect.

In a third aspect of the first embodiment of the flow path cleaning method, the cleaning step includes the stream cleaning step of supplying the mobile phase and the cleaning solution to the analysis flow path (4) in a state in which the analysis flow path (4) and the sampling flow path (2) do not communicate with each other in a fluid manner. According to this aspect, carry-over derived from the analysis flow path can be effectively eliminated as necessary. The third aspect can be combined with the first aspect and/or the second aspect.

In the third aspect, the stream cleaning step can be executed while the mobile phase is being supplied to the analysis flow path (4) to perform conditioning of the separation column (14) for subsequent analysis. With this configuration, the inside of the analysis flow path can be effectively cleaned during conditioning of the separation column, and analysis throughput is improved.

In a fourth aspect of the first embodiment of the flow path cleaning method, the cleaning step includes the system cleaning step of supplying the mobile phase and the cleaning solution to the analysis flow path (4) and the sampling flow path (2) in a state in which the analysis flow path (4) and the sampling flow path (2) communicate with each other in a fluid manner. According to this aspect, a sample path upon sample injection into the analysis flow path can be, as necessary, cleaned using an analysis mobile phase and the cleaning solution, and a carry-over elimination effect can be improved. The fourth aspect can be combined with the first aspect, the second aspect, and/or the third aspect.

A fifth aspect of the first embodiment of the flow path cleaning method further includes the blank injection step of injecting a blank solution containing no sample into the analysis flow path (4) after the cleaning step. The blank injection is executed so that not only the effect of cleaning the inside of the analysis flow path and the sampling flow path can be expected, but also the effect of cleaning the inside of the analysis flow path and/or the sampling flow path can be checked. The fifth aspect can be combined with the first aspect, the second aspect, the third aspect, and/or the fourth aspect.

A sixth aspect of the first embodiment of the flow path cleaning method further includes the pressure release step of stopping a supply of the mobile phase and the cleaning solution to the analysis flow path (4) to decrease a pressure upstream of the separation column (14) during, before, or after execution of the cleaning step. According to this aspect, the pressure release is executed as necessary so that the effect of cleaning the inside of the analysis flow path and/or the sampling flow path can be further enhanced.

A second embodiment of the flow path cleaning method according to the present invention is a flow path cleaning method in a liquid chromatograph including an analysis flow path (4) provided with a separation column (14) for separating a component in a sample. The method includes the pressure release step of stopping a supply of a mobile phase to the analysis flow path (4) in a state in which a pressure at a portion upstream of the separation column (14) in the analysis flow path (4) is higher than an atmospheric pressure to decrease the pressure at the upstream portion.

The second embodiment of the flow path cleaning method may further include the blank injection step of injecting a blank solution containing no sample into the analysis flow path (4) after the pressure release step. The blank injection is executed so that not only the effect of removing a carry-over component which becomes easily detachable from a flow path inner wall due to the pressure release can be expected, but also a carry-over elimination effect by the pressure release can be checked.

What is claimed is:

1. A liquid chromatograph comprising:
   at least one mobile phase supply flow path for supplying a mobile phase, the at least one mobile phase supply flow path including an analysis mobile phase supply flow path for supplying an analysis mobile phase;
   at least one cleaning solution supply flow path to supply a cleaning solution as liquid having a property different from that of the mobile phase;
   an analysis flow path provided with a separation column for separating a component in a sample;
   a sampling flow path provided, at a tip end thereof, with a sampling needle moving three-dimensionally and performing liquid suction from a tip end thereof;
   a delivery flow path having an upper stream end to which both of the mobile phase supply flow path and the cleaning solution supply flow path are connected, the delivery flow path being provided for delivering toward the analysis flow path and/or the sampling flow path the mobile phase supplied from the mobile phase supply flow path and the cleaning solution supplied from the cleaning solution supply flow path,
   a switcher including a high-pressure valve having an injection port connected to the sampling flow path by insertion of the tip end of the needle into the injection port and configured to switch a flow path configuration of the liquid chromatograph between a loading state in which the analysis mobile phase supply flow path and the analysis flow path are connected in a fluid manner without the sampling flow path and an injecting state in which the sampling flow path is interposed between the analysis mobile phase supply flow path and the analysis flow path when the tip end of the needle is inserted into the injection port; and
   a controller configured to control operation of supplying the mobile phase through the mobile phase supply flow path, operation of supplying the cleaning solution through the cleaning solution supply flow path, operation of the needle, and operation of the switcher and execute, when a predetermined condition is satisfied, cleaning operation of delivering the mobile phase and the cleaning solution to the analysis flow path and/or the sampling flow path through the delivery flow path to temporally change a composition of liquid flowing in the analysis flow path and/or the sampling flow path;
   wherein the controller is configured to
      temporally change, by using a stepwise method or a gradient method, a flow rate of the mobile phase supplied from the mobile phase supply flow path to the delivery flow path and a flow rate of the cleaning solution supplied from the cleaning solution supply flow path to the delivery flow path, such that the composition is temporally changed of the liquid delivered to the analysis flow path and/or the sampling flow path, and
      clean the analysis flow path and/or the sampling flow path by using the temporally changed composition of liquid.

2. The liquid chromatograph according to claim 1, wherein the mobile phase supply flow path is configured to supply multiple types of mobile phases therethrough, and the controller is configured to temporally change, in the cleaning operation, the composition of the liquid flowing in the analysis flow path and/or the sampling flow path by means of the multiple types of mobile phases and the cleaning solution.

3. The liquid chromatograph according to claim 1, wherein
   the controller is configured to switch, in the cleaning operation, the liquid supplied through the delivery flow path to the analysis flow path and/or the sampling flow path between the mobile phase and the cleaning solution.

4. The liquid chromatograph according to claim 1, wherein
the mobile phase supply flow path includes a mobile phase pump configured to deliver the mobile phase, and the cleaning solution supply flow path includes a cleaning solution pump configured to deliver the cleaning solution.

5. The liquid chromatograph according to claim 1, further comprising:
as a mobile phase supply flow path different from the analysis mobile phase supply flow path, a cleaning mobile phase supply flow path for supplying a cleaning mobile phase having a composition identical to that of the analysis mobile phase,
wherein one of the cleaning solution supply flow paths joins the cleaning mobile phase supply flow path, and
when a first condition is satisfied, the controller is configured to execute, as the cleaning operation, needle cleaning for supplying the cleaning mobile phase and the cleaning solution to the sampling flow path after the switcher has switched the flow path configuration to the loading state.

6. The liquid chromatograph according to claim 1, wherein
one of the cleaning solution supply flow paths joins the analysis mobile phase supply flow path, and
when a second condition is satisfied, the controller is configured to execute, as the cleaning operation, stream cleaning for supplying the analysis mobile phase and the cleaning solution to the analysis flow path after the switcher has switched the flow path configuration to the loading state.

7. The liquid chromatograph according to claim 6, wherein
the controller is configured to supply the analysis mobile phase to the analysis flow path to execute the stream cleaning as part of conditioning of the separation column for subsequent analysis.

8. The liquid chromatograph according to claim 1, wherein
when a third condition is satisfied, the controller is configured to execute, as the cleaning operation, system cleaning for supplying the analysis mobile phase and the cleaning solution to the analysis flow path and the sampling flow path after the switcher has switched the flow path configuration to the injecting state.

9. The liquid chromatograph according to claim 1, wherein
the controller is configured to execute, after the cleaning operation has ended, blank injection for collecting a blank solution containing no sample by the needle to inject the blank solution into the analysis flow path through the injection port.

10. The liquid chromatograph according to claim 1, wherein
when a fourth condition is satisfied, the controller is configured to execute, during, before, or after execution of the cleaning operation, pressure release for stopping a supply of the analysis mobile phase and the cleaning solution to the analysis flow path to decrease a pressure upstream of the separation column.

11. A flow path cleaning method in a liquid chromatograph including an analysis flow path provided with a separation column for separating a component in a sample and a sampling flow path provided, at a tip end thereof, with a needle injecting the sample into the analysis flow path, comprising:
a cleaning step of supplying a mobile phase and a cleaning solution having a property different from that of the mobile phase through a common delivery flow path to the analysis flow path and/or the sampling flow path to temporally change a composition of liquid flowing in the analysis flow path and/or the sampling flow path, by using a stepwise method or a gradient method.

12. The flow path cleaning method according to claim 11, wherein
at the cleaning step, the composition of the liquid flowing in the analysis flow path and/or the sampling flow path is temporally changed by means of multiple types of mobile phases and the cleaning solution.

13. The flow path cleaning method according to claim 12, wherein
at the cleaning step, the liquid supplied to the analysis flow path and/or the sampling flow path is switched between the mobile phase and the cleaning solution.

14. The flow path cleaning method according to claim 11, wherein
the cleaning step includes a needle cleaning step of supplying the mobile phase and the cleaning solution to the sampling flow path in a state in which the analysis flow path and the sampling flow path do not communicate with each other in a fluid manner.

15. The flow path cleaning method according to claim 11, wherein
the cleaning step includes a stream cleaning step of supplying the mobile phase and the cleaning solution to the analysis flow path in a state in which the analysis flow path and the sampling flow path do not communicate with each other in a fluid manner.

16. The flow path cleaning method according to claim 15, wherein
the stream cleaning step is executed while the mobile phase is being supplied to the analysis flow path to perform conditioning of the separation column for subsequent analysis.

17. The flow path cleaning method according to claim 11, wherein
the cleaning step includes a system cleaning step of supplying the mobile phase and the cleaning solution to the analysis flow path and the sampling flow path in a state in which the analysis flow path and the sampling flow path communicate with each other in a fluid manner.

18. The flow path cleaning method according to claim 11, further comprising:
a blank injection step of injecting a blank solution containing no sample into the analysis flow path after the cleaning step.

19. The flow path cleaning method according to claim 11, further comprising:
a pressure release step of stopping a supply of the mobile phase and the cleaning solution to the analysis flow path to decrease a pressure upstream of the separation column during, before, or after execution of the cleaning step.

* * * * *